US012685291B2

(12) United States Patent
Tang

(10) Patent No.: US 12,685,291 B2
(45) Date of Patent: Jul. 21, 2026

(54) FALSE-DETECTION PREVENTION LITTER BOX

(71) Applicant: PETPIVOT INC, Portland, OR (US)

(72) Inventor: Tieqiang Tang, Shaoyang City (CN)

(73) Assignee: PETPIVOT INC, Portland, OR (US)

( * ) Notice: Subject to any disclaimer, the term of this patent is extended or adjusted under 35 U.S.C. 154(b) by 272 days.

(21) Appl. No.: 18/392,864

(22) Filed: Dec. 21, 2023

(65) Prior Publication Data

US 2025/0194553 A1 Jun. 19, 2025

(30) Foreign Application Priority Data

Dec. 14, 2023 (CN) .......................... 202323406907.1

(51) Int. Cl.
  *A01K 1/01* (2006.01)
  *A01K 29/00* (2006.01)
  *G01G 23/00* (2006.01)

(52) U.S. Cl.
  CPC .......... *A01K 1/0114* (2013.01); *A01K 29/005* (2013.01); *G01G 23/002* (2013.01)

(58) Field of Classification Search
  CPC ... A01K 1/0114; A01K 29/005; G01G 23/002
  See application file for complete search history.

(56) References Cited

U.S. PATENT DOCUMENTS

| | | | | | |
|---|---|---|---|---|---|
| 5,107,797 | A | * | 4/1992 | LaRoche | A01K 1/0114 209/296 |
| 5,662,066 | A | * | 9/1997 | Reitz | A01K 1/0114 119/163 |
| 6,126,015 | A | * | 10/2000 | Haymaker | B07B 1/28 209/362 |
| 6,202,595 | B1 | * | 3/2001 | Atcravi | A01K 1/0114 119/165 |
| 7,017,519 | B1 | * | 3/2006 | Deasy | A01K 1/011 119/166 |
| 10,321,659 | B1 | * | 6/2019 | Turner | A01K 1/0114 |
| 11,399,502 | B2 | * | 8/2022 | Baxter | A01K 1/011 |
| 11,412,704 | B2 | * | 8/2022 | Noh | A01K 1/011 |
| 12,439,885 | B2 | * | 10/2025 | Smith | A01K 1/0114 |
| 12,457,990 | B2 | * | 11/2025 | Wei | A01K 1/0114 |
| 2006/0081191 | A1 | * | 4/2006 | Deasy | A01K 1/0114 119/166 |
| 2020/0042780 | A1 | * | 2/2020 | Hori | A01K 1/0107 |

(Continued)

FOREIGN PATENT DOCUMENTS

| | | | | | |
|---|---|---|---|---|---|
| CN | 110574709 | A | * | 12/2019 | ........... A01K 1/0107 |
| CN | 110580598 | A | * | 12/2019 | ........ G06Q 10/0875 |

(Continued)

*Primary Examiner* — Monica L Perry
*Assistant Examiner* — Aaron M Rodziwicz

(57) ABSTRACT

A false-detection prevention litter box is provided. The litter box includes a litter box main body, a supporting platform, a first supporting leg and a weighing sensor. The weighing sensor includes a connecting part and a sensing part. The sensing part of the weighing sensor is configured to sense a change in a weight of the litter box main body. The connecting part of the weighing sensor is connected to the litter box main body. The sensing part of the weighing sensor is connected to a first end of the first supporting leg. A second end of the first supporting leg is abutted with the supporting platform.

17 Claims, 9 Drawing Sheets

(56)　　　　　References Cited

U.S. PATENT DOCUMENTS

| | | | |
|---|---|---|---|
| 2020/0260684 A1* | 8/2020 | Kaneko | A01K 1/0114 |
| 2020/0383295 A1* | 12/2020 | Huang | G01G 23/42 |
| 2022/0142114 A1* | 5/2022 | Baxter | A01K 1/0052 |
| 2024/0114874 A1* | 4/2024 | Zhang | A01K 1/0114 |
| 2025/0072384 A1* | 3/2025 | Duan | A01K 1/0107 |
| 2025/0113800 A1* | 4/2025 | Jiang | A01K 1/0114 |

FOREIGN PATENT DOCUMENTS

| | | | | |
|---|---|---|---|---|
| CN | 112378501 A | * | 2/2021 | G01G 19/00 |
| CN | 113692976 A | * | 11/2021 | G01G 19/52 |
| CN | 114793920 A | * | 7/2022 | A01K 29/00 |
| CN | 118235711 A | * | 6/2024 | A01K 1/0114 |
| CN | 120167340 A | * | 6/2025 | A01K 1/0114 |
| EP | 3360411 B1 | * | 10/2024 | A61B 5/208 |
| JP | 7109268 B2 | * | 7/2022 | G01G 19/52 |

* cited by examiner

FALSE-DETECTION PREVENTION LITTER BOX

CROSS-REFERENCE TO RELATED APPLICATIONS

The application claims priority of Chinese patent application CN2023234069071, filed on Dec. 14, 2023, which is incorporated herein by reference in its entireties.

TECHNICAL FIELD

The present disclosure relates to a litter box, and in particular, to a false-detection prevention litter box, which is applied to the technical field of pet supplies.

BACKGROUND

At present, more and more people like to keep pets in their spare time. In the process of keeping pets, the problem of excretion of the pets has always bothered owners. Cats are taken as an example. A litter box or a cat toilet is usually used by pet cats, but the litter box or the cat toilet needs to be cleaned timely. Otherwise, for people, the strong odor of excrements of the cats will affect indoor air; and for cats, they will no longer be willing to defecate in the litter box or the cat toilet and will change their defection places or refrain from defecating. Those who are familiar with cats know that if a cat does not defecate for three days, its health will be directly affected.

Therefore, some existing intelligent litter boxes or cat toilets are provided with weighing devices to record and visually reflect a weight and defecation information of a cat by monitoring a weight of a box body, so as to know defecation time and a defecation amount and learn about a basic health status of the cat.

At present, the weighing sensor of the existing litter box is arranged between a supporting leg and a supporting seat. The supporting leg is configured to support the supporting seat in a suspended state, and the supporting leg is fixedly connected to the supporting seat. The arrangement of the weighing sensor has the following defects: 1. When the ground is uneven, this arrangement will be affected by the uneven ground, leading to a zero drift. As a result, an error occurs in measurement of the weighing sensor. 2. Due to the contact between the supporting leg and the ground, the weighing sensor can only work on the hard ground, and the ground needs to be even, otherwise, the weighing sensor is inaccurate in measurement. 3. If a user directly drags and moves the product on the ground, the weighing sensor will be easy to damage, causing inaccurate subsequent measurement of the weighing sensor of the product, or causing a weight measurement function of the product to fail.

SUMMARY

When the ground is uneven, the aforementioned weighing sensor designed for the litter box in the prior art will be affected by the uneven ground if the ground is uneven, causing a zero drift. As a result, the weighing sensor has an error in measurement. The present disclosure provides a false-detection prevention litter box.

One end of the first supporting leg is abutted with the supporting platform, the other end of the first supporting leg is connected to the sensing part of the weighing sensor, and the connecting part of the weighing sensor is connected to the litter box main body, so that the first supporting leg is always abutted with the supporting platform, and the weighing sensor will not be in a suspended state and can precisely detect a weight change generated by the litter box main body, which solves the problem of a measurement error of the weighing sensor in the prior art.

The technical solution adopted by the present disclosure to solve the technical problem is as follows.

A false-detection prevention litter box, wherein the litter box includes a litter box main body, a supporting platform, a first supporting leg, and a weighing sensor, wherein the weighing sensor includes a connecting part and a sensing part; the sensing part of the weighing sensor is configured to sense a change in a weight of the litter box main body; the connecting part of the weighing sensor is connected to the litter box main body; the sensing part of the weighing sensor is connected to one end of the first supporting leg; and the other end of the first supporting leg is abutted with the supporting platform.

Further, the supporting platform includes a weighing platform and a second supporting leg; the weighing platform is mounted on the second supporting leg; one end of the first supporting leg is abutted with the weighing platform; the first supporting leg is correspondingly arranged above the second supporting leg; and the litter box main body is movably mounted on the weighing platform.

Further, a mounting slot is arranged on the supporting platform, and one end of the first supporting leg is mounted in the mounting slot.

Further, a bayonet located around the mounting slot is arranged on the weighing platform; a clamping member is arranged around the second supporting leg; and the clamping member passes through the bayonet from a bottom of the weighing platform and is clamped to the weighing platform to connect the second supporting leg to the weighing platform.

Further, the clamping member includes a first bulge and a second bulge; the first bulge is arranged around one end connected to the weighing platform, and the first bulge is arranged in a longitudinal extension direction of the second supporting leg; the second bulge is arranged on an outer side surface of the first bulge; a gap and a third bulge are arranged at the bayonet; the third bulge is arranged on an outer edge of the bayonet, and the third bulge is arranged towards an interior of the bayonet; when the second supporting leg is mounted on the weighing platform, after the second bulge passes through the gap, the second bulge is rotated; and the second bulge is clamped onto the third bulge.

Further, a surface of the third bulge is provided with a fourth bulge; a surface of the second bulge is provided with a clamping slot; after the second bulge passes through the gap, the second bulge is rotated until the fourth bulge is clamped into the clamping slot; or, a surface of the second bulge is provided with a fourth bulge, and a surface of the third bulge is provided with a clamping slot; and after the second bulge passes through the gap, the second bulge is rotated until the fourth bulge is clamped into the clamping slot.

Further, a surface of the fourth bulge is an arc-shaped surface; a slot surface of the clamping slot is arranged in a manner of corresponding to the surface of the fourth bulge; and when the fourth bulge is clamped into the clamping slot, the second bulge is rotated, and the fourth bulge is separated from the clamping slot.

Further, the litter box further includes a mounting bottom shell; the mounting bottom shell is arranged between the weighing platform and the litter box main body; the mounting bottom shell is mounted on the weighing platform; the weighing platform is provided with a first boss facing the mounting bottom shell; the mounting bottom shell is provided with a second boss; the second boss is provided with a through hole; the mounting slot is arranged on the first boss; the through hole is arranged in a manner of corresponding to the mounting slot; the second boss sleeves the first boss; the litter box main body is movably mounted on the mounting bottom shell; the mounting bottom shell is provided with the through hole; one end of the first supporting leg is mounted in the mounting slot through the through hole; and the second supporting leg is arranged below the first boss.

Further, the connecting part is arranged at a periphery of the sensing part; one end of the sensing part is connected to the connecting part; and the sensing part moves up and down relative to the connecting part.

Further, the weighing sensor is a strain gauge type pressure sensor.

Further, a hollow mounting column is arranged at a bottom of the litter box main body; the mounting column is arranged in a manner of facing the first supporting leg; a supporting rib is arranged around an inner side wall of a cavity of the mounting column; the connecting part is mounted on a supporting end of the supporting rib; the sensing part is located in the cavity of the mounting column; and when the weight of the litter box main body increases, the mounting column presses the connecting part, and the sensing part moves in the cavity of the mounting column.

Further, a limiting column is also arranged in the cavity of the mounting column; the limiting column is arranged in a manner of corresponding to the sensing part; the limiting column is slightly lower than the supporting end of the supporting rib; and the limiting column is configured to limit the sensing part.

Further, the litter box main body, the weighing sensor, the first supporting leg, and the supporting platform are arranged in sequence from top to bottom.

Further, a foot pad is arranged at a bottom of the second supporting leg.

Further, the litter box main body includes a roller and a supporting seat; the roller is rotatably arranged on the supporting seat; the supporting seat is arranged on the supporting platform; and the supporting seat is connected to the supporting platform to form a base.

Further, the base is provided with a supporting column; a rear end surface of the roller is provided with a first gear; an upper surface of the base is sunken downwards to form an avoiding slot matched with the roller; one end of the supporting column located in the avoiding slot is opposite to an end surface of the roller; the avoiding slot is provided with a carrying slot for carrying two ends of the roller; the base is provided with a motor configured to drive the roller to rotate; a rotating shaft of the motor is connected with a second gear engaged with the first gear; the second gear is located on the carrying slot; and the roller rotates through the first gear when the motor drives the second gear to rotate.

Further, an integral partition plate and a sifter are arranged in the roller; the integral partition plate forms an accommodating slot with an inner wall of the roller and is integrally molded with the roller; a first opening is formed in one side of the roller far from a notch of the accommodating slot; when the roller rotates, litter and waste are sifted through the sifter; and when the roller continues to rotate, the waste is rotated to the first opening along the integral partition plate.

Further, the roller includes a first shell and a second shell connected to the first shell; the integral partition plate includes a first partition plate integrally molded with the first shell and a second partition plate integrally molded with the second shell; and the first partition plate and the second partition plate form the integral partition plate when the first shell is connected to the second shell.

Further, the litter box further includes a collection box; the collection box is arranged at a bottom of the base; a second opening communicated to the collection box is formed in the base; the roller rotates relative to the base; and when the second opening is opposite to the first opening, the waste falls into the collection box through the second opening and the first opening in sequence.

Further, the collection box is detachably arranged at the bottom of the base.

Beneficial effects of the present disclosure are as follows: The present disclosure provides a false-detection prevention litter box. One end of the first supporting leg is abutted with the supporting platform, the other end of the first supporting leg is connected to the sensing part of the weighing sensor, and the connecting part of the weighing sensor is connected to the litter box main body, so that the first supporting leg is always abutted with the supporting platform, and the weighing sensor will not be in a suspended state and can precisely detect a weight change generated by the litter box main body, which solves the problem of a measurement error of the weighing sensor in the prior art.

DETAILED DESCRIPTION OF THE EMBODIMENTS

In order to make the aims, technical solution and advantages of the present disclosure will be clearly, the present disclosure is further described below in combination with accompanying drawings and implementations. It should be understood that the specific embodiments described herein are intended only to explain the present disclosure and are not intended to define the present disclosure.

Figure 1:
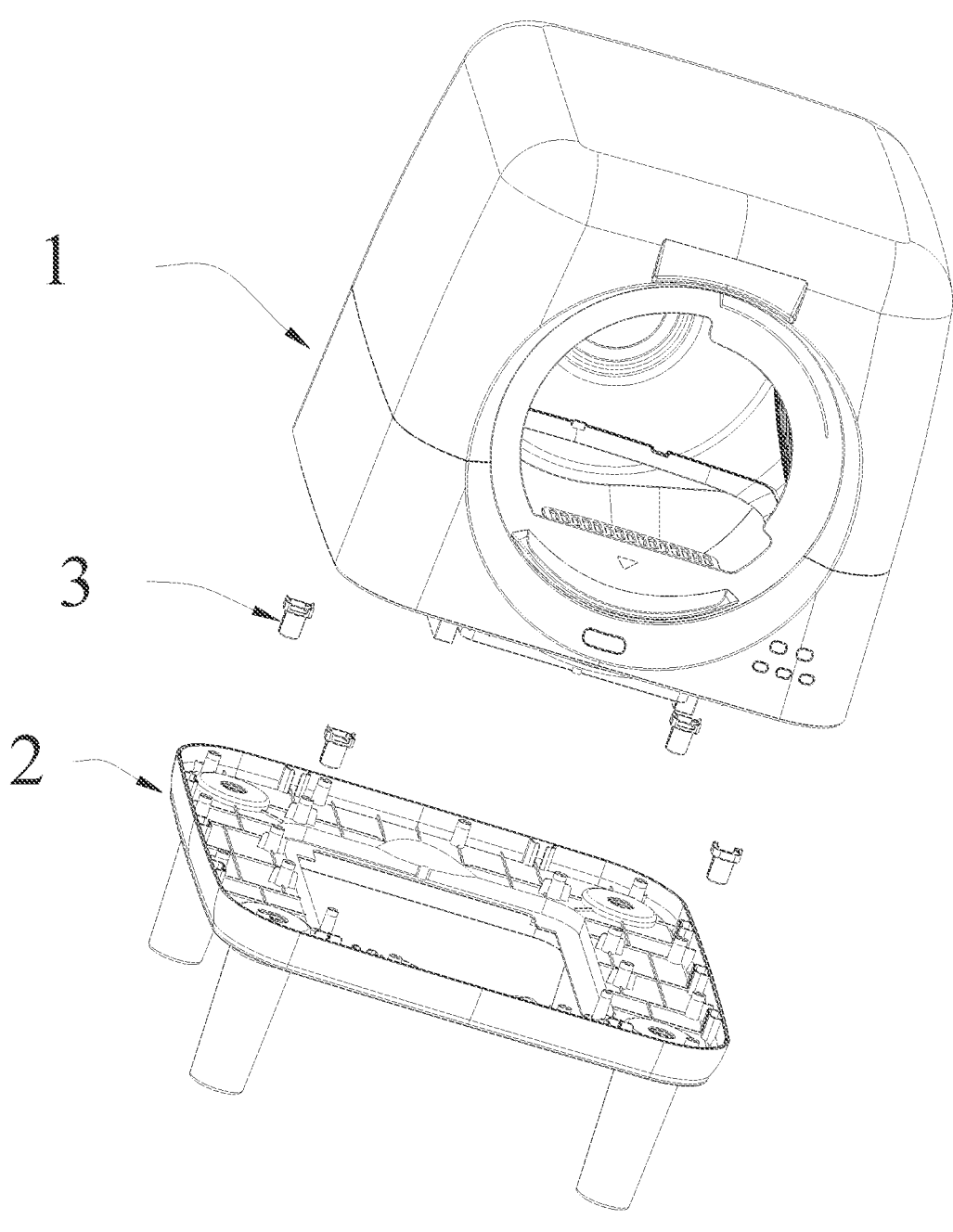
FIG. 1 is a schematic structural diagram of a litter box according to the present disclosure.
Figure 2:
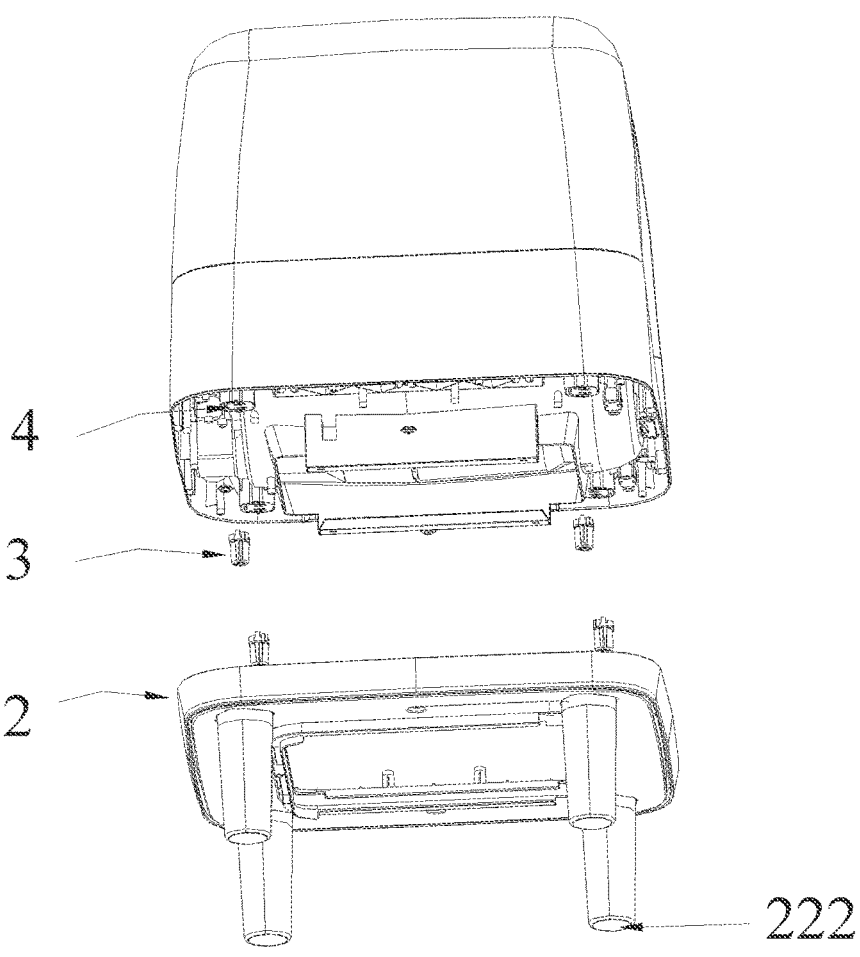
FIG. 2 is a schematic structural diagram of a litter box according to the present disclosure.
Figure 3:
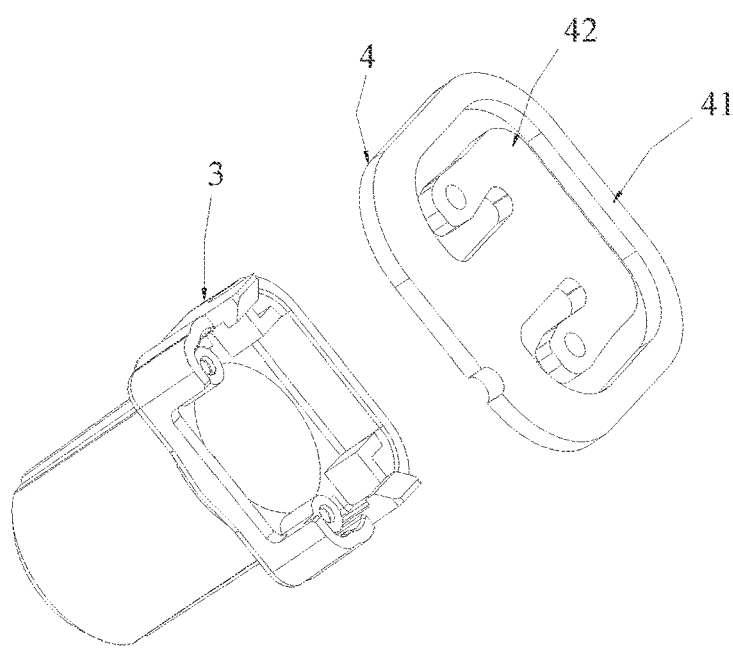
FIG. 3 is a schematic structural diagram of a first supporting leg and a weighing sensor according to the present disclosure.

Referring to FIG. 1 to FIG. 13, the present disclosure provides a false-detection prevention litter box. As shown in FIG. 1 to FIG. 3, the litter box includes a litter box main body 1, a supporting platform 2, a first supporting leg 3, and a weighing sensor 4. The weighing sensor 4 includes a connecting part 41 and a sensing part 42; the sensing part 42 of the weighing sensor is configured to sense a change in a weight of the litter box main body 1; the connecting part 41 of the weighing sensor is connected to the litter box main body 1; the sensing part 42 of the weighing sensor is connected to one end of the first supporting leg 3; and the other end of the first supporting leg 3 is abutted with the supporting platform 2. That is, one end of the first supporting leg is abutted with the supporting platform, the other end of the first supporting leg is connected to the sensing part of the weighing sensor, and the connecting part of the weighing sensor is connected to the litter box main body, so that the first supporting leg is always abutted with the supporting platform, and the weighing sensor will not be in a suspended state and can precisely detect a weight change generated by the litter box main body, which solves the problem of a measurement error of the weighing sensor in the prior art. It should be noted that the supporting platform refers to a platform surface. Due to the platform surface, when the litter box is on an uneven ground, the first supporting leg can always be abutted with the platform surface to ensure that the weighing sensor is not in the suspended state, so that even if the litter box is placed on the uneven ground or on a carpet or soft mat, and the weighing sensor will not have a detection error. This expands an application range of a user and improves the user experience.

Figure 4:
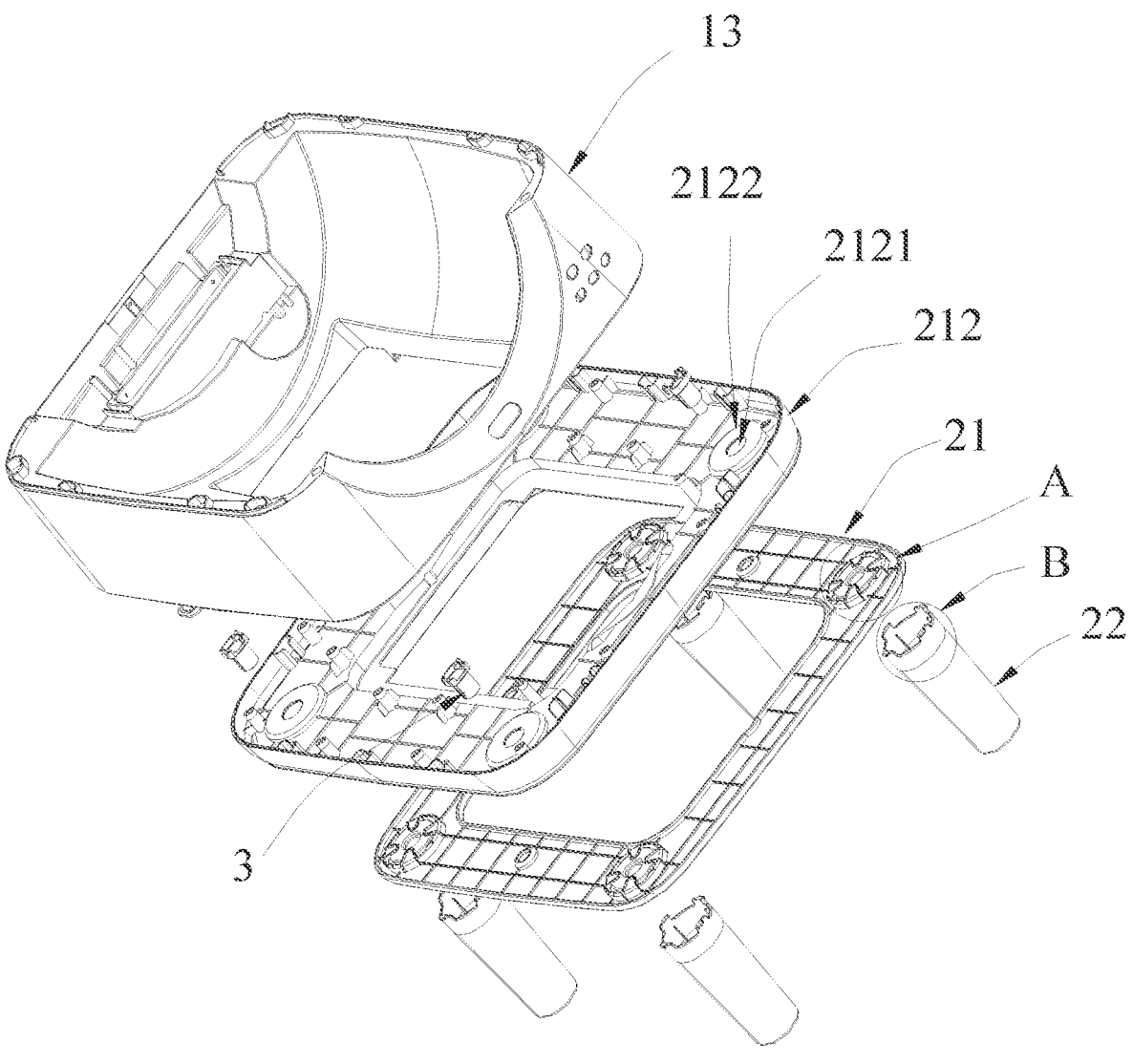
FIG. 4 is a partially schematic structural diagram of a litter box according to the present disclosure.

In this embodiment, as shown in FIG. 4, the supporting platform 2 includes a weighing platform 21 and a second supporting leg 22; the weighing platform 21 is mounted on the second supporting leg 22; one end of the first supporting leg 3 is abutted with the weighing platform 21; the first supporting leg 3 is correspondingly arranged above the second supporting leg 22; and the litter box main body 1 is movably mounted on the weighing platform 21. That is, the second supporting leg supports the weighing platform and the litter box main body to be in a suspended state, so that the entire litter box is more aesthetically pleasing and three-dimensional. It should be noted that the litter box main body 1 is movably mounted on the weighing platform 21. First, the weighing sensor is protected during movement of the litter box. The supporting leg of the litter box in the prior art is integrated with a base. When a user directly drags and moves the product on the ground, the weighing sensor is easy to damage, causing the product to fail. In this embodiment, the litter box main body is movably connected to the weighing platform, which is convenient for first removing the litter box main body and then moving the supporting platform, so as not to damage the weighing sensor. Secondly, the weighing sensor in this embodiment is preferably set as a resistance strain sensor, and the sensing part is a resistance strain gauge. When a weight of the resistance strain gauge changes, the resistance strain gauge deforms slightly, making detection more accurate. If the weighing platform 21 is connected and fixed to the litter box main body, the resistance strain gauge cannot move, which will cause a small error in detection. Thirdly, the first supporting leg is mainly configured to be connected to the weighing platform 21, but it is not a main acting force for supporting the litter box main body. Therefore, the litter box main body 1 is movably mounted on the weighing platform 21, and the weighing platform 21 supports the litter box main body.

Figure 5:
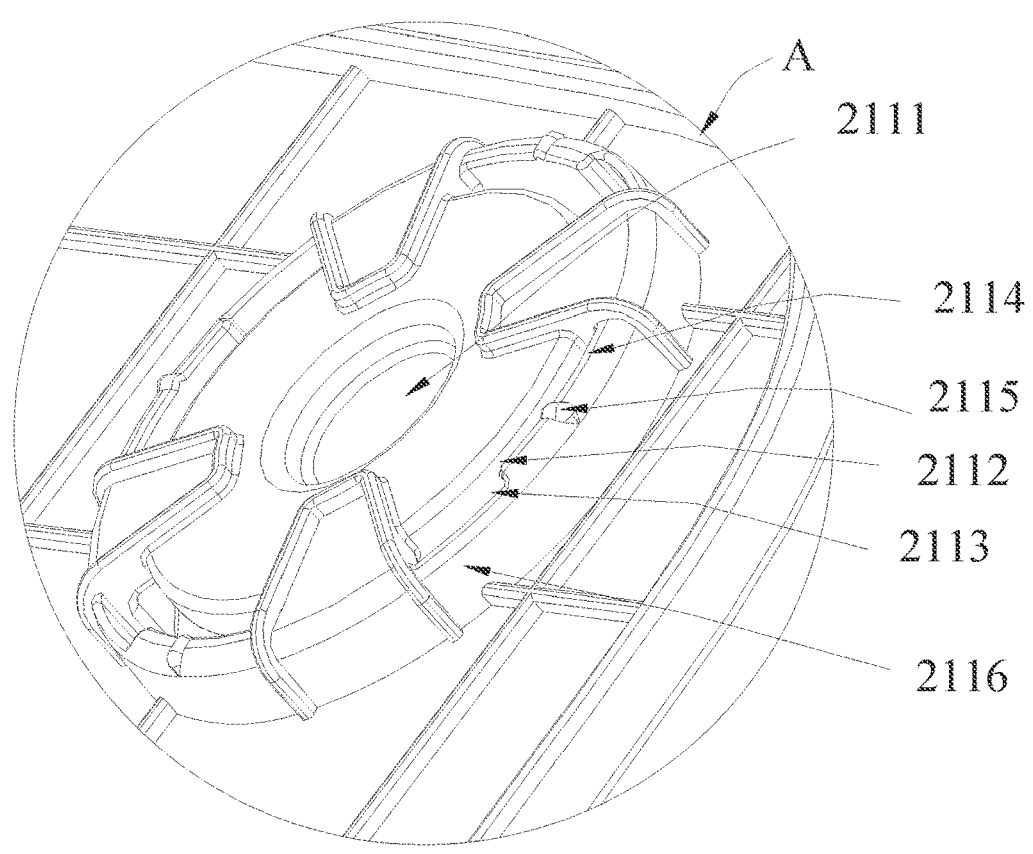
FIG. 5 is an enlarged view of A according to the present disclosure.

In this embodiment, as shown in FIG. 5, a mounting slot 2111 is arranged on the supporting platform 2, and one end of the first supporting leg 3 is mounted in the mounting slot 2111, so that the first supporting leg 3 achieves more stable supporting.

Figure 6:
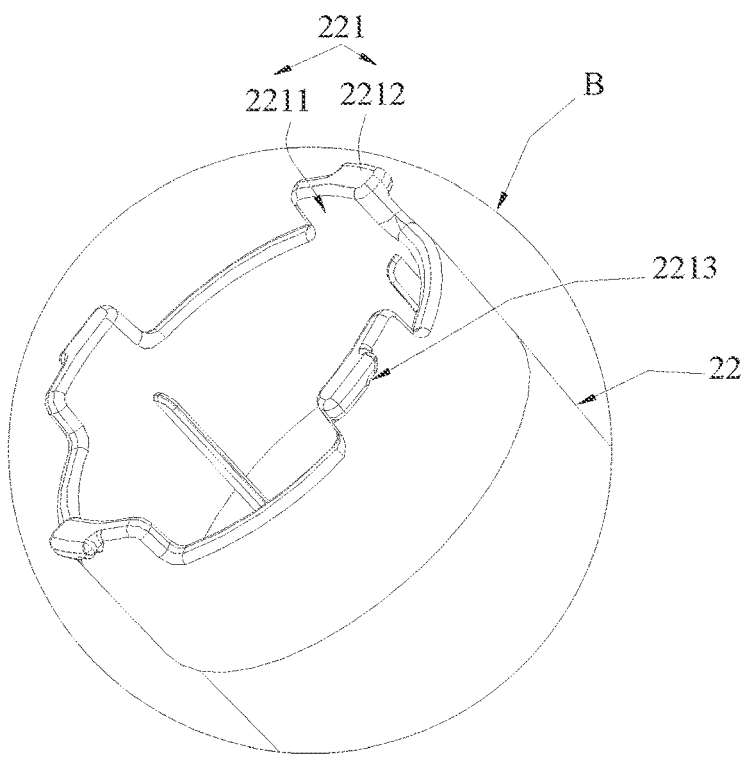
FIG. 6 is an enlarged view of B according to the present disclosure.

In this embodiment, as shown in FIG. 4 to FIG. 6, a bayonet 2112 located around the mounting slot 2111 is arranged on the weighing platform 21; a clamping member 221 is arranged around the second supporting leg 22; and the clamping member 221 passes through the bayonet 2112 from a bottom of the weighing platform 21 and is clamped to the weighing platform 21 to connect the second supporting leg to the weighing platform 21. By the arrangement of the bayonet and the clamping member, it is convenient for the mounting of the second supporting leg.

In this embodiment, as shown in FIG. 5 to FIG. 6, the clamping member 221 includes a first bulge 2211 and a second bulge 2212; the first bulge 2211 is arranged around one end connected to the weighing platform 21, and the first bulge 2211 is arranged in a longitudinal extension direction of the second supporting leg 22; the second bulge 2212 is arranged on an outer side surface of the first bulge 2211; a gap 2113 and a third bulge 2114 are arranged at the bayonet 2112; the third bulge 2114 is arranged on an outer edge of the bayonet, and the third bulge 2114 is arranged towards an interior of the bayonet 2112; when the second supporting leg 22 is mounted on the weighing platform 21, after the second bulge 2212 passes through the gap 2113, the second bulge 2212 is rotated; and the second bulge 2212 can be clamped onto the third bulge 2114. This structure mainly achieves quickly mounting the second supporting leg on the weighing platform 21 without adding other components and reducing mounting procedures. In this embodiment, the first bulge and the second bulge are integrally molded, and the third bulge 2114 and the weighing platform 21 are integrally molded. The integrated molding is convenient for demolding.

In this embodiment, as shown in FIG. 5 to FIG. 6, a surface of the third bulge 2114 is provided with a fourth bulge 2115; a surface of the second bulge 2212 is provided with a clamping slot 2213; after the second bulge passes through the gap, the second bulge 2212 can be rotated until the fourth bulge 2115 is clamped into the clamping slot 2213; or, a surface of the second bulge 2212 is provided with a fourth bulge 2115, and a surface of the third bulge 2114 is provided with a clamping slot 2213; and after the second bulge passes through the gap, the second bulge 2212 can be rotated until the fourth bulge 2115 is clamped into the clamping slot 2213. The design of this structure is mainly to prevent the second supporting leg from being separated from the weighing platform. This structure is convenient for the mounting of the second supporting leg and is simple. The fourth bulge 2115 and the third bulge 2114 of this embodiment are integrally molded. The integrated molding is convenient for demolding.

In this embodiment, as shown in FIG. 5 to FIG. 6, a surface of the fourth bulge 2115 is an arc-shaped surface; a slot surface of the clamping slot 2213 is arranged in a manner of corresponding to the surface of the fourth bulge 2115; and when the fourth bulge 2115 is clamped into the clamping slot 2213, the second bulge 2212 is rotated, and the fourth bulge 2115 can be separated from the clamping slot 2213. This facilitates mounting and removal of the first supporting leg.

In this embodiment, as shown in FIG. 4 to FIG. 6, the weighing platform 21 includes a weighing platform 21 and a mounting bottom shell 212; the mounting bottom shell 212 is mounted on the weighing platform 21; the weighing platform 21 is provided with a first boss 2116 facing the mounting bottom shell 212; the mounting bottom shell 212 is provided with a second boss 2122; the second boss 2122 is provided with a through hole 2121; the mounting slot 2111 is arranged on the first boss 2116; the through hole 2121 is arranged in a manner of corresponding to the mounting slot 2111; the second boss 2122 sleeves the first boss 2116; the litter box main body 1 is movably mounted on the mounting bottom shell 212; the mounting bottom shell 212 is provided with the through hole 2121; one end of the first supporting leg 3 is mounted in the mounting slot 2111 through the through hole 2121; and the second supporting leg 22 is arranged below the first boss 2116. This structural design is mainly to make a supporting force of the first supporting leg more stable.

In this embodiment, as shown in FIG. 3, the connecting part 41 is arranged at a periphery of the sensing part 42; one end of the sensing part 42 is connected to the connecting part 41; and the sensing part 42 can move up and down relative to the connecting part 41. Therefore, the structure and mounting of the weighing sensor are clearer, and all connecting points are connected clearly. It is convenient for connection.

In this embodiment, the weighing sensor is a strain gauge type pressure sensor. A basic principle of the resistance strain pressure sensor is a strain effect of a resistor: When a conductor mechanically deforms, a resistance value of the conductor changes, which is referred to as "strain effect". That is, the sensing part is a resistance strain gauge. When a weight of the litter box main body changes, the resistance value will change.

Figure 7:
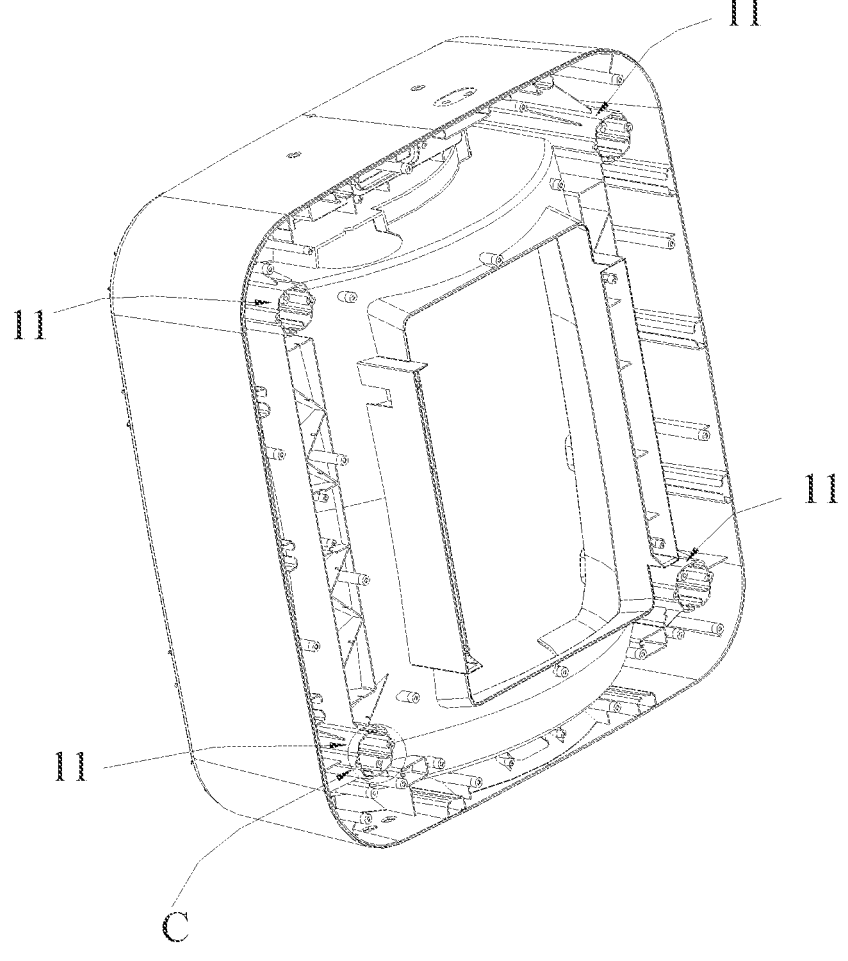
FIG. 7 is a three-dimensional diagram of a supporting seat according to the present disclosure.
Figure 8:
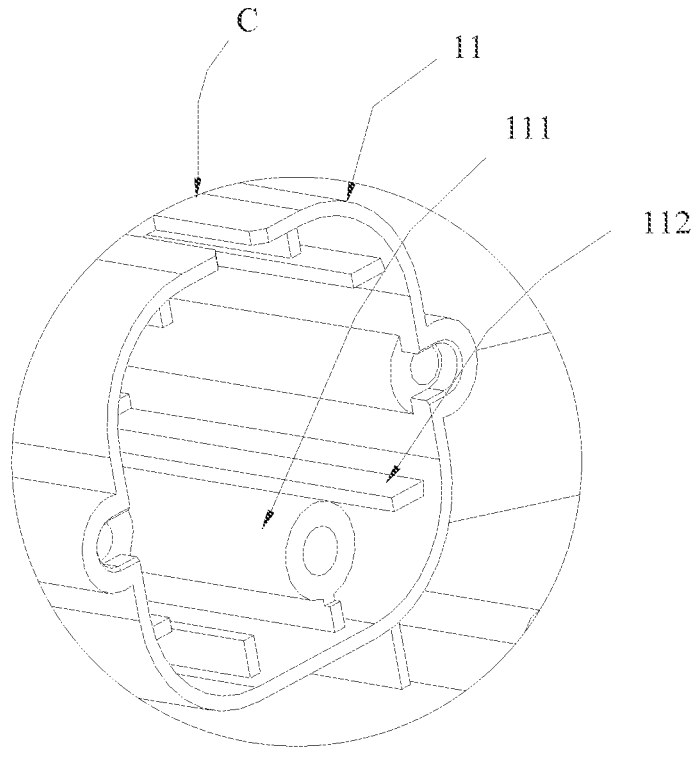
FIG. 8 is an enlarged view of C according to the present disclosure.

In this embodiment, as shown in FIG. 7 to FIG. 8, a hollow mounting column 11 is arranged at a bottom of the litter box main body 1; the mounting column 11 is arranged in a manner of facing the first supporting leg 3; a supporting rib 111 is arranged around an inner side wall of a cavity of the mounting column 11; the connecting part 41 is mounted on a supporting end of the supporting rib 111; the sensing part 42 is located in the cavity of the mounting column 11; and when the weight of the litter box main body 1 increases, the mounting column 11 presses the connecting part 41, and the sensing part 42 can move in the cavity of the mounting column 11. This structure is more convenient for the mounting of the weighing sensor.

In this embodiment, as shown in FIG. 7 to FIG. 8, a limiting column 112 is also arranged in the cavity of the mounting column 11; the limiting column 112 is arranged in a manner of corresponding to the sensing part 42; the limiting column 112 is slightly lower than the supporting end of the supporting rib 111; and the limiting column 112 can be configured to limit the sensing part 42. The limiting column 112 prevents an excessive pressure on the litter box and prevents an extremely high pressure on the sensing part of the weighing sensor to damage the weighing sensor.

In this embodiment, as shown in FIG. 4, the litter box main body 1, the weighing sensor 4, the first supporting leg 3, and the supporting platform 2 are arranged in sequence from top to bottom, which makes the mounting procedure clearer.

In this embodiment, as shown in FIG. 2, a foot pad 222 is arranged at a bottom of the second supporting leg 22 to protect the second supporting leg and prevent the second supporting leg from being damaged when the litter box is moved. The foot pad also has a mute effect during the movement of the litter box.

Figure 9:
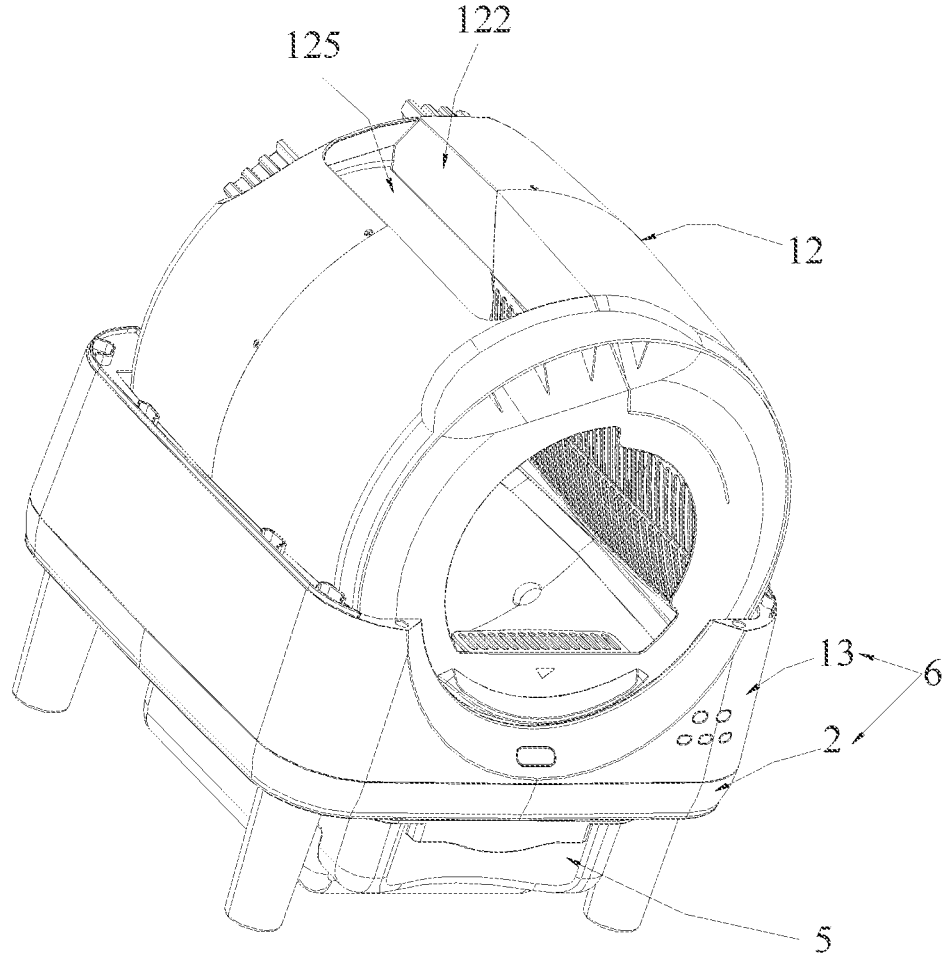
FIG. 9 is a three-dimensional diagram of a litter box according to the present disclosure.

In this embodiment, as shown in FIG. 9, the litter box main body 1 includes a roller 12 and a supporting seat 13; the roller 12 is rotatably arranged on the supporting seat 13; the supporting seat 13 is arranged on the supporting platform 2; and the supporting seat 13 is connected to the supporting platform 2 to form a base 6. In this way, it is more convenient for mounting.

Figure 10:
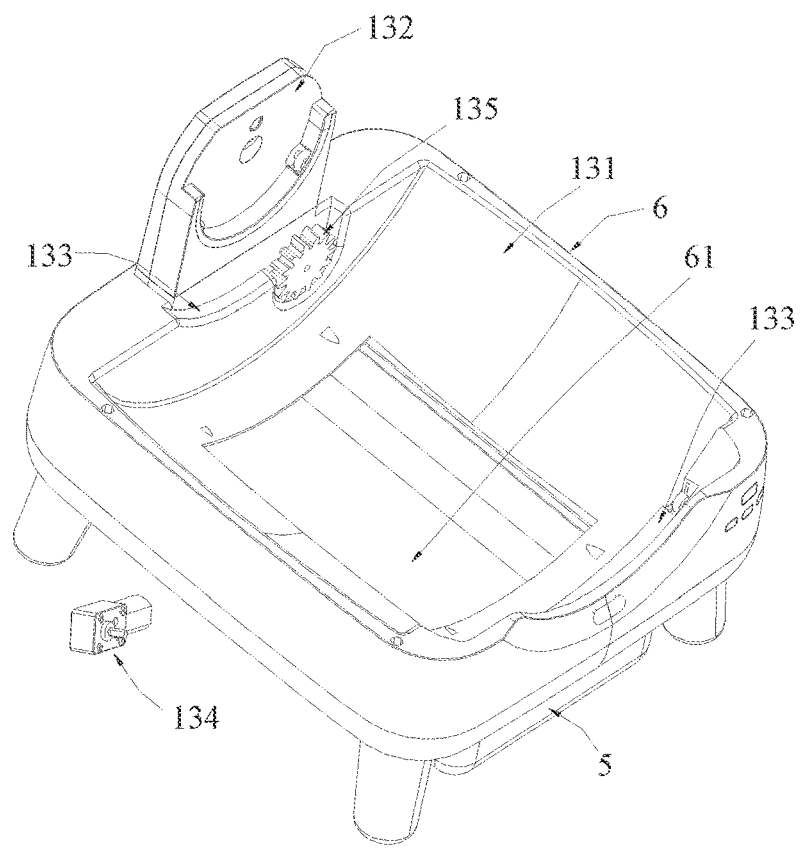
FIG. 10 is a three-dimensional diagram of a base according to the present disclosure.
Figure 11:
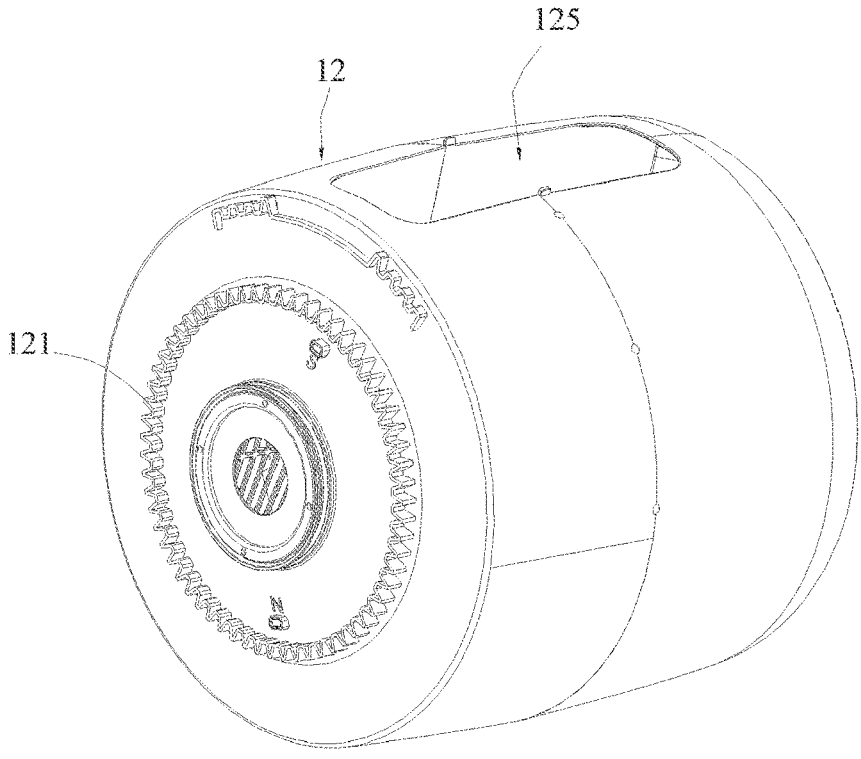
FIG. 11 is a three-dimensional diagram of a roller according to the present disclosure.

In this embodiment, as shown in FIG. 10 to FIG. 11, the base 6 is provided with a supporting column 132; a rear end surface of the roller 12 is provided with a first gear 121; an upper surface of the base 6 is sunken downwards to form an avoiding slot 131 matched with the roller 12; one end of the supporting column 132 located in the avoiding slot 131 is opposite to an end surface of the roller 12; the avoiding slot 131 is provided with a carrying slot 133 for carrying two ends of the roller 12; the base 6 is provided with a motor 134 configured to drive the roller 12 to rotate; a rotating shaft of the motor 134 is connected with a second gear 135 engaged with the first gear 121; and the second gear 135 is located on the carrying slot 133. In this way, when the motor drives the second gear to rotate, the roller rotates through the first gear.

In this embodiment, as shown in FIG. 10 to FIG. 11, an integral partition plate 122 and a sifter 123 are arranged in the roller 12; the integral partition plate 122 forms an accommodating slot 124 with an inner wall of the roller 12 and is integrally molded with the roller 12; a first opening 125 is formed in one side of the roller 12 far from a notch of the accommodating slot 124; when the roller 12 rotates, litter and waste are sifted through the sifter 123; and when the roller continues to rotate, the waste is rotated to the first opening 125 along the integral partition plate 122. In this embodiment, the integral partition plate and the roller 12 are integrally molded, which can effectively reduce the assembling process of the integral partition plate, reduce the production procedure of the litter box, and improve the production efficiency of the litter box. In this way, there is no joint between the integral partition plate and the roller 12, which can prevent the litter from being left in the joint and facilitate cleaning of a litter bin.

Figure 12:
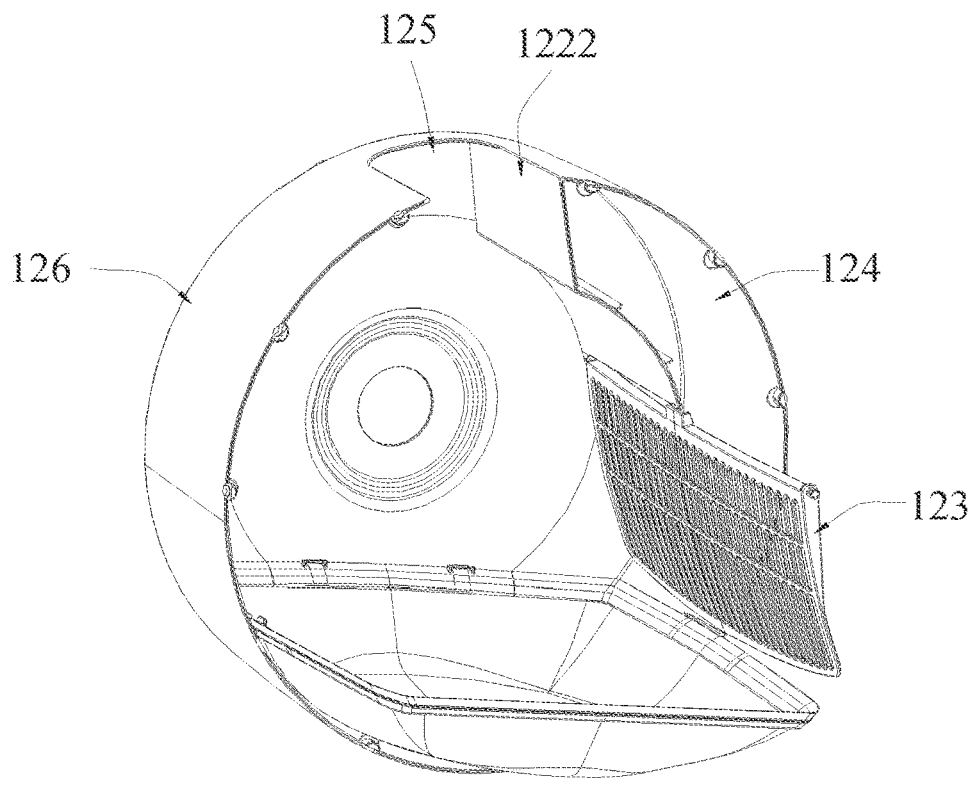
FIG. 12 is a schematic structural diagram of a first shell according to the present disclosure.
Figure 13:
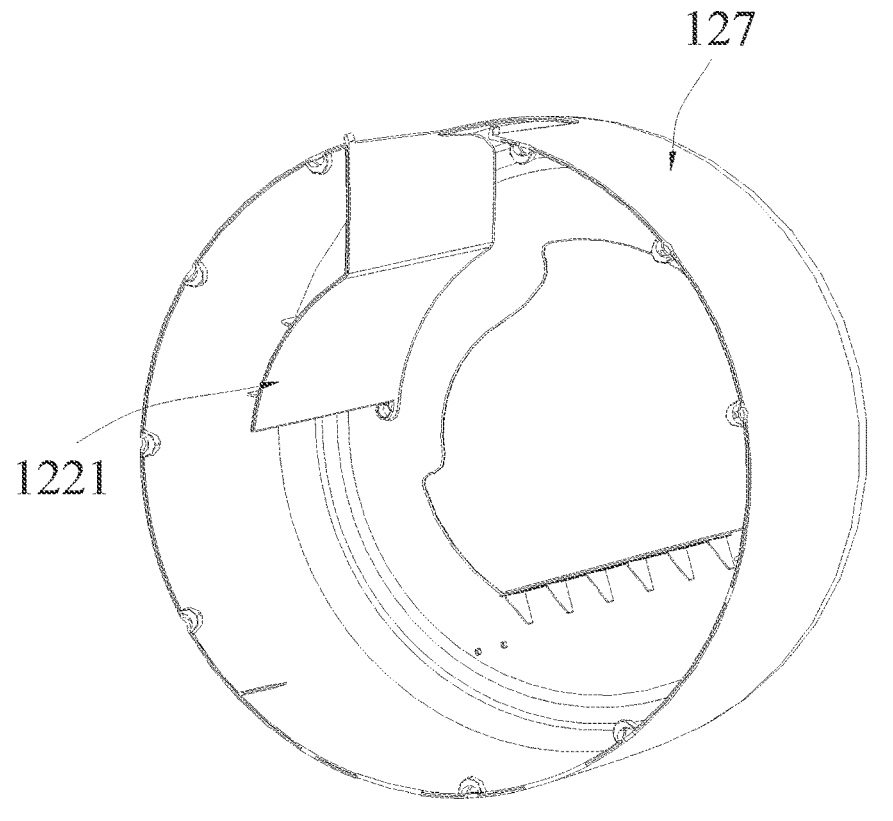
FIG. 13 is a schematic structural diagram of a second shell according to the present disclosure.

In this embodiment, as shown in FIG. 12 to FIG. 13, the roller 12 includes a first shell 126 and a second shell 127 connected to the first shell 126; the integral partition plate 122 includes a first partition plate 1221 integrally molded with the first shell 126 and a second partition plate 1222 integrally molded with the second shell 127; and the first partition plate 1221 and the second partition plate 1222 form the integral partition plate 122 when the first shell is connected to the second shell 127. It can be understood that the first shell is a front half part of the roller 12, and the second shell is a rear half part of the roller 12. The first opening 125 is formed by connecting the first shell to the second shell. Of course, in other embodiments, the first shell and the second shell can also be a left half part and a right half part of the roller 12.

In this embodiment, as shown in FIG. 12 to FIG. 13, the litter box further includes a collection box 5; the collection box 5 is arranged at a bottom of the base 6; a second opening 61 communicated to the collection box 5 is formed in the base 6; the roller 12 rotates relative to the base 6; and when the second opening 61 is opposite to the first opening 125, the waste falls into the collection box 5 through the second opening 61 and the first opening 125 in sequence. The collection box 5 is convenient to take down, and it is convenient for a user to clean waste of a pet regularly.

In this embodiment, the collection box 5 is detachably arranged at the bottom of the base 6. In this way, the collection box 5 can be suspended, and it is convenient to take out the collection box 5.

The above is only the preferred embodiments of the present disclosure, and is not intended to limit the present disclosure. Any modifications, equivalent replacements and improvements that are made within the spirit and principle of the present disclosure shall fall within the protection scope of the present disclosure.

What is claimed is:

1. A false-detection prevention litter box, wherein the litter box comprises a litter box main body, a supporting platform, a first supporting leg, and a weighing sensor, wherein the weighing sensor comprises a connecting part and a sensing part; the sensing part of the weighing sensor is configured to sense a change in a weight of the litter box main body; the connecting part of the weighing sensor is connected to the litter box main body; the sensing part of the weighing sensor is connected to a first end of the first supporting leg; and a second end of the first supporting leg is abutted with the supporting platform;

wherein the supporting platform comprises a weighing platform and a second supporting leg; the weighing platform is mounted on the second supporting leg; one end of the first supporting leg is abutted with the weighing platform; the first supporting leg is correspondingly arranged above the second supporting leg; and the litter box main body is movably mounted on the weighing platform;

wherein a mounting slot is arranged on the supporting platform, and one end of the first supporting leg is mounted in the mounting slot;

wherein a bayonet located around the mounting slot is arranged on the weighing platform; a clamping member is arranged around the second supporting leg; and the clamping member passes through the bayonet from a bottom of the weighing platform and is clamped to the weighing platform to connect the second supporting leg to the weighing platform.

2. The false-detection prevention litter box according to claim 1, wherein the clamping member comprises a first bulge and a second bulge; the first bulge is arranged around one end connected to the weighing platform, and the first bulge is arranged in a longitudinal extension direction of the second supporting leg; the second bulge is arranged on an outer side surface of the first bulge; a gap and a third bulge are arranged at the bayonet; the third bulge is arranged on an outer edge of the bayonet, and the third bulge is arranged towards an interior of the bayonet; when the second supporting leg is mounted on the weighing platform, after the second bulge passes through the gap, the second bulge is rotated; and the second bulge is clamped onto the third bulge.

3. The false-detection prevention litter box according to claim 2, wherein a surface of the third bulge is provided with a fourth bulge; a surface of the second bulge is provided with a clamping slot; after the second bulge passes through the gap, the second bulge is rotated until the fourth bulge is clamped into the clamping slot; or, a surface of the second bulge is provided with a fourth bulge, and a surface of the third bulge is provided with a clamping slot; and after the second bulge passes through the gap, the second bulge is rotated until the fourth bulge is clamped into the clamping slot.

4. The false-detection prevention litter box according to claim 3, wherein a surface of the fourth bulge is an arc-shaped surface; a slot surface of the clamping slot is arranged in a manner of corresponding to the surface of the fourth bulge; and when the fourth bulge is clamped into the clamping slot, the second bulge is rotated, and the fourth bulge is separated from the clamping slot.

5. The false-detection prevention litter box according to claim 1, wherein the connecting part is arranged at a periphery of the sensing part; one end of the sensing part is connected to the connecting part; and the sensing part moves up and down relative to the connecting part.

6. The false-detection prevention litter box according to claim 5, wherein the weighing sensor is a strain gauge type pressure sensor.

7. The false-detection prevention litter box according to claim 1, wherein the litter box main body, the weighing sensor, the first supporting leg, and the supporting platform are arranged in sequence from top to bottom.

8. The false-detection prevention litter box according to claim 1, wherein a foot pad is arranged at a bottom of the second supporting leg.

9. The false-detection prevention litter box according to claim 1, wherein the litter box main body comprises a roller and a supporting seat; the roller is rotatably arranged on the supporting seat; the supporting seat is arranged on the supporting platform; and the supporting seat is connected to the supporting platform to form a base.

10. The false-detection prevention litter box according to claim 9, wherein the base is provided with a supporting column; a rear end surface of the roller is provided with a first gear; an upper surface of the base is sunken downwards to form an avoiding slot matched with the roller; one end of the supporting column located in the avoiding slot is opposite to an end surface of the roller; the avoiding slot is provided with a carrying slot for carrying two ends of the roller; the base is provided with a motor configured to drive the roller to rotate; a rotating shaft of the motor is connected with a second gear engaged with the first gear; the second gear is located on the carrying slot; and the roller rotates through the first gear when the motor drives the second gear to rotate.

11. The false-detection prevention litter box according to claim 9, wherein an integral partition plate and a sifter are arranged in the roller; the integral partition plate forms an accommodating slot with an inner wall of the roller and is integrally molded with the roller; a first opening is formed in one side of the roller away from a notch of the accommodating slot; when the roller rotates, litter and waste are sifted through the sifter; and when the roller continues to rotate, the waste is rotated to the first opening along the integral partition plate.

12. The false-detection prevention litter box according to claim 11, wherein the roller comprises a first shell and a second shell connected to the first shell; the integral partition plate comprises a first partition plate integrally molded with the first shell and a second partition plate integrally molded with the second shell; and the first partition plate and the second partition plate form the integral partition plate when the first shell is connected to the second shell.

13. The false-detection prevention litter box according to claim 12, wherein the litter box further comprises a collection box; the collection box is arranged at a bottom of the base; a second opening communicated to the collection box is formed in the base; the roller rotates relative to the base; and when the second opening is opposite to the first opening, the waste falls into the collection box through the second opening and the first opening in sequence.

14. The false-detection prevention litter box according to claim 13, wherein the collection box is detachably arranged at the bottom of the base.

15. A false-detection prevention litter box, wherein the litter box comprises a litter box main body, a supporting platform, a first supporting leg, and a weighing sensor, wherein the weighing sensor comprises a connecting part and a sensing part; the sensing part of the weighing sensor is configured to sense a change in a weight of the litter box main body; the connecting part of the weighing sensor is connected to the litter box main body; the sensing part of the weighing sensor is connected to a first end of the first supporting leg; and a second end of the first supporting leg is abutted with the supporting platform;

wherein the supporting platform comprises a weighing platform and a second supporting leg; the weighing platform is mounted on the second supporting leg; one end of the first supporting leg is abutted with the weighing platform; the first supporting leg is correspondingly arranged above the second supporting leg; and the litter box main body is movably mounted on the weighing platform;

wherein a mounting slot is arranged on the supporting platform, and one end of the first supporting leg is mounted in the mounting slot;

wherein the litter box further comprises a mounting bottom shell; the mounting bottom shell is arranged between the weighing platform and the litter box main body; the mounting bottom shell is mounted on the weighing platform; the weighing platform is provided with a first boss facing the mounting bottom shell; the mounting bottom shell is provided with a second boss; the second boss is provided with a through hole; the mounting slot is arranged on the first boss; the through hole is arranged in a manner of corresponding to the mounting slot; the second boss sleeves the first boss; the litter box main body is movably mounted on the mounting bottom shell; the mounting bottom shell is provided with the through hole; one end of the first supporting leg is mounted in the mounting slot through the through hole; and the second supporting leg is arranged below the first boss.

16. A false-detection prevention litter box, wherein the litter box comprises a litter box main body, a supporting platform, a first supporting leg, and a weighing sensor, wherein the weighing sensor comprises a connecting part and a sensing part; the sensing part of the weighing sensor is configured to sense a change in a weight of the litter box main body; the connecting part of the weighing sensor is connected to the litter box main body; the sensing part of the weighing sensor is connected to a first end of the first supporting leg; and a second end of the first supporting leg is abutted with the supporting platform;

wherein the connecting part is arranged at a periphery of the sensing part; one end of the sensing part is connected to the connecting part; and the sensing part moves up and down relative to the connecting part;

wherein a hollow mounting column is arranged at a bottom of the litter box main body; the mounting column is arranged in a manner of facing the first supporting leg; a supporting rib is arranged around an inner side wall of a cavity of the mounting column; the connecting part is mounted on a supporting end of the supporting rib; the sensing part is located in the cavity of the mounting column; and when the weight of the litter box main body increases, the mounting column presses the connecting part, and the sensing part moves in the cavity of the mounting column.

17. The false-detection prevention litter box according to claim 16, wherein a limiting column is also arranged in the cavity of the mounting column; the limiting column is arranged in a manner of corresponding to the sensing part; the limiting column is lower than the supporting end of the supporting rib; and the limiting column is configured to limit the sensing part.

\* \* \* \* \*